US008677356B2

(12) United States Patent
Jacobs et al.

(10) Patent No.: US 8,677,356 B2
(45) Date of Patent: Mar. 18, 2014

(54) ADJUNCT PARTITION WORK SCHEDULING WITH QUALITY OF SERVICE ATTRIBUTES

(75) Inventors: Stuart Z. Jacobs, Lakeville, MN (US); David A. Larson, Rochester, MN (US); Kyle A. Lucke, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 13/004,106

(22) Filed: Jan. 11, 2011

(65) Prior Publication Data

US 2012/0180046 A1    Jul. 12, 2012

(51) Int. Cl.
    *G06F 9/455* (2006.01)
(52) U.S. Cl.
    USPC ............................................. 718/1; 718/104
(58) Field of Classification Search
    None
    See application file for complete search history.

(56) References Cited

U.S. PATENT DOCUMENTS

| | | | | |
|---|---|---|---|---|
| 6,711,607 | B1* | 3/2004 | Goyal | 709/203 |
| 2006/0271575 | A1* | 11/2006 | Harris et al. | 707/100 |
| 2007/0091089 | A1* | 4/2007 | Jiao et al. | 345/426 |
| 2007/0156869 | A1* | 7/2007 | Galchev et al. | 709/223 |
| 2008/0005438 | A1* | 1/2008 | Xing et al. | 710/241 |
| 2009/0037906 | A1* | 2/2009 | Armstrong et al. | 718/1 |
| 2009/0037941 | A1 | 2/2009 | Armstrong et al. | |
| 2009/0049453 | A1* | 2/2009 | Baran et al. | 719/313 |
| 2009/0182967 | A1* | 7/2009 | Cardona et al. | 711/165 |
| 2009/0248937 | A1 | 10/2009 | Solomon et al. | |
| 2009/0249330 | A1* | 10/2009 | Abercrombie et al. | 718/1 |
| 2009/0276773 | A1 | 11/2009 | Brown et al. | |
| 2009/0313391 | A1 | 12/2009 | Watanabe et al. | |
| 2010/0014526 | A1 | 1/2010 | Chavan et al. | |
| 2010/0077384 | A1* | 3/2010 | Ostrovsky et al. | 717/127 |
| 2010/0082874 | A1 | 4/2010 | Baba et al. | |
| 2010/0095310 | A1 | 4/2010 | Oshins et al. | |
| 2010/0122124 | A1* | 5/2010 | Chen et al. | 714/57 |
| 2010/0180274 | A1 | 7/2010 | Cherian et al. | |
| 2011/0023050 | A1* | 1/2011 | Strom et al. | 719/313 |
| 2011/0296234 | A1* | 12/2011 | Oshins et al. | 714/5.11 |
| 2012/0089794 | A1* | 4/2012 | Seelam et al. | 711/158 |
| 2012/0102212 | A1* | 4/2012 | Sood et al. | 709/229 |
| 2012/0117353 | A1* | 5/2012 | Armstrong et al. | 711/173 |
| 2012/0137288 | A1* | 5/2012 | Barrett et al. | 718/1 |
| 2012/0151472 | A1* | 6/2012 | Koch et al. | 718/1 |
| 2012/0159481 | A1* | 6/2012 | Anderson et al. | 718/1 |
| 2012/0210044 | A1* | 8/2012 | Armstrong et al. | 711/6 |

OTHER PUBLICATIONS

S. Mangold, "Analysis of IEEE 802.11e for QoS Support in Wireless LANs", IEEE Wireless Commun. Mag., vol. 10, No. 6, pp. 40-50 2003.*

* cited by examiner

*Primary Examiner* — Emerson Puente
*Assistant Examiner* — Mehran Kamran
(74) *Attorney, Agent, or Firm* — Wood, Herron & Evans LLP

(57) ABSTRACT

Operating system-directed workload scheduling of an adjunct partition in a logically partitioned computer is selectively overridden to handle platform work requiring a Quality of Service (QoS) guarantee. Firmware may track outstanding requests for platform work for an adjunct partition, and in response to a request for platform work that requires a QoS guarantee, the firmware may assume or take over scheduling decisions for the adjunct partition from the operating system of an associated logical partition and schedule execution of the adjunct partition to ensure that the adjunct partition will be allocated sufficient execution resources to perform the platform work independent of the scheduling desires of the operating system. As a result, any platform work that potentially impacts the platform work of other adjunct partitions will not be held up as a result of an unwillingness or inability of the operating system to schedule execution of the adjunct partition.

25 Claims, 10 Drawing Sheets

ADJUNCT PARTITION WORK SCHEDULING WITH QUALITY OF SERVICE ATTRIBUTES

FIELD OF THE INVENTION

The invention is generally related to data processing, and in particular to logically partitioned data processing systems and self-virtualizing input/output devices for use with same.

BACKGROUND OF THE INVENTION

Modern requirements for a computer system may require that a computer be utilized to run several operating environments, or operating systems, at once. In a typical embodiment, a single logically partitioned computer or data processing system can run a plurality of operating systems in a corresponding plurality of logical partitions (LPARs), also referred to as virtual machines (VMs). Each operating system resides in its own LPAR, with each LPAR allocated a part of a physical processor, an entire physical processor, or multiple physical processors from the computer. Additionally, a portion of the computer's memory is allocated to each LPAR. An underlying partition manager, often referred to as a hypervisor or virtual machine monitor (VMM), manages and controls the LPARs. The hypervisor is typically a part of the system firmware and manages the allocation of resources to the operating systems and LPARs. As such, one logically partitioned computer may run one or more LPARs and thus virtualize the operations of the applications, operating systems, and other program code configured to operate in those logical partitions.

In addition to sharing the physical processors and memory in a logically partitioned computer, LPARs also typically share other types of physical hardware resources, which are collectively referred to herein as input/output (IO) resources. For example, in order to provide LPARs with access to external networks, logically partitioned computers typically include multiple physical network adapters, e.g., network interface cards (NICs), that are shared by the LPARs, such that each LPAR is allocated at least a part of one or more physical network adapters to enable that LPAR to access various networks, e.g., local area networks, wide area networks, storage networks, the Internet, etc. Many IO resources, including many network adapters, are compliant with various Peripheral Component Interconnect (PCI) standards. PCI-compliant IO resources typically implement one or more PCI functions, e.g., to support different protocols such as Ethernet, Fibre Channel over Ethernet (FCoE), etc.

Access to IO resources in both logically partitioned and non-partitioned computers is typically handled at the operating system level through the use of device drivers. Device drivers typically provide a common interface to the operating system and the applications executing thereon to effectively hide the implementation details of a particular hardware device from these higher software layers. High level commands from these higher software layers are typically translated to device-specific commands that are appropriate for the particular make and model of the underlying IO resource. Therefore, so long as different device drivers from different vendors of a particular type of IO resource provide the same common interface to the operating system and applications, the operating system and applications can access the IO resource using the same commands and without concern for the particular make and model of the IO resource.

In many conventional logically partitioned computers, IO resources are virtualized within the hypervisor, so that conventional device drivers, appropriate for use in both logically partitioned and non-partitioned computers, may be used. Virtualization of an IO resource in a hypervisor typically requires that the hypervisor trap device accesses by the device drivers in the LPARs and effectively route the operations to the appropriate physical IO resources. Thus, where multiple LPARs share a common physical IO resource, the hypervisor itself handles the multiplexing of operations performed by the physical IO resource on behalf of each LPAR. Allocating such higher-level functionality to a hypervisor, however, has been found to introduce excessive complexity and processing overhead to the hypervisor. It is desirable in many implementations for a hypervisor to be as small, compact, fast and secure as possible so that the processing overhead of the hypervisor is minimized. As such, other technologies have been introduced in an attempt to off-load the responsibility of virtualizing IO resources from the hypervisor.

For example, in some designs, a dedicated LPAR, referred to as a virtual input/output server (VIOS), may be used to manage the virtualization of IO resources. While the use of a VIOS offloads higher-level functions from the hypervisor and reduces the overall complexity of the hypervisor, it has been found that using LPARs to provide such services to other LPARs requires relatively high overhead to instantiate and run the LPAR, and thus, a full operating system, in order to provide such services.

More recently, some designs have relied upon adjunct partitions (APs), which have also been referred to as partition adjuncts, to assist with the virtualization of IO resources. An AP is a type of partition that is more limited than a full, logical partition. An AP typically runs in a flat, static effective address space and problem state, which permits the hypervisor to apply a range of hypervisor and processor optimizations that result in a substantial decrease in system overhead associated with a context switch of the state machine from an LPAR to state data of an AP, that is, compared to a context switch of the state machine between two LPARs. In other respects, an AP is similar to a full LPAR. For example, an AP typically can be assigned resources, either physical or virtual, similar to a full LPAR. Further, an AP can be an end-point of a virtual input output (VIO) communications mechanism, similar to a full LPAR, such as VIOS.

In addition, some designs have incorporated the concept of self-virtualization of IO resources, where at least a portion of the virtualization of a physical IO resource is handled within the resource itself. The PCI single root input/output virtualization (SRIOV) specification, for example, enables a physical IO resource such as a NIC to incorporate replicated onboard functionality such as memory spaces, work queues, interrupts, and command processing so that a single function such as a single Ethernet connection can be presented to a logically partitioned computer as multiple and separate physical functions. The SRIOV specification introduces the concepts of physical functions (PFs) and virtual functions (VFs), with the former representing full PCI functions and having the ability to instantiate, configure and manage VFs, and the latter representing lightweight PCI functions with reduced configuration resources and usable by LPARs to access a self-virtualizing device.

It has been found that the use of APs in conjunction with self-virtualizing IO resources provides a flexible, efficient framework with which to virtualize IO resources in a logically partitioned computer, and does so without requiring a separate full LPAR to provide the virtualization, and without requiring such functionality to be embedded within client LPARs or in the hypervisor.

Some inefficiencies nonetheless exist in logically-partitioned computers that utilize APs to manage self-virtualizing IO resources. For example, in some environments, APs execute within the context of their associated LPARs, with work scheduling of such APs primarily under the direct control of the operating systems installed in the associated LPARs. In addition, in some environments, device drivers for the VFs are resident in the APs, and certain reliability, availability and serviceability (RAS) capabilities and management functions may require these VF device drivers for all of the VFs of a self-virtualizing IO resource to perform work in concert with each other. This type of work is referred to herein as platform work, as it is associated with work that is generally related to the underlying platform and/or to configuration or management of the APs and other components of the underlying platform, as opposed to the primary workloads of the APs, which typically focus on communicating data between the LPARs and the self-virtualizing IO resources.

There is a concern, however, that allocating control of the work scheduling of APs to the operating systems in the associated LPARs presents the risk of a possible denial of service scenario, where due to either an unwillingness or inability of an operating system to allow one AP to handle pending platform work for a VF may result in other APs that are also performing related platform work stalling or hanging while waiting for that AP to complete its related platform work.

A need therefore exists in the art for a manner of ensuring quality of service for platform work in APs of a logically partitioned computer.

SUMMARY OF THE INVENTION

The invention addresses these and other problems associated with the prior art by selectively overriding operating system-directed workload scheduling of an adjunct partition in a logically partitioned computer in order to handle platform work requiring a Quality of Service (QoS) guarantee. In particular, firmware in a logically partitioned computer may track outstanding requests for platform work for an adjunct partition, and in response to a request for platform work that requires a QoS guarantee, the firmware may assume or take over scheduling decisions for the adjunct partition from the operating system of an associated logical partition and schedule execution of the adjunct partition to ensure that the adjunct partition will be allocated sufficient execution resources to handle the platform work independent of the scheduling desires of the operating system. As a result, any platform work that potentially impacts the platform work of other adjunct partitions will not be held up as a result of an unwillingness or inability of the operating system to schedule execution of the adjunct partition.

Therefore, consistent with one aspect of the invention, execution of an adjunct partition assigned to a logical partition is scheduled in a logically partitioned data processing system by initially scheduling execution of the adjunct partition under control of an operating system resident in the logical partition to enable the adjunct partition to handle partition work for the logical partition, and thereafter, in a firmware of the logically partition data processing system and in response to a request for platform work requiring a Quality of Service (QoS) guarantee, scheduling execution of the adjunct partition independent of the operating system to enable the adjunct partition to handle the requested platform work.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention selectively override operating system-directed workload scheduling of an adjunct partition in a logically partitioned computer in order to handle platform work requiring a Quality of Service (QoS) guarantee. In this regard, platform work that requires a QoS guarantee typically includes work in an adjunct partition that impacts other adjunct partitions, such that the other adjunct partitions would otherwise not be able to proceed with other work if the platform work in the adjunct partition is not allowed to proceed.

Firmware in a logically partitioned computer consistent with the invention tracks outstanding requests for platform work for an adjunct partition, and in response to a request for platform work that requires a QoS guarantee, the firmware assumes or otherwise takes over scheduling decisions for the adjunct partition from the operating system of an associated logical partition and schedules execution of the adjunct partition to ensure that the adjunct partition will be allocated sufficient execution resources to handle the platform work independent of the scheduling desires of the operating system. As a result, any platform work that potentially impacts the platform work of other adjunct partitions will not be held up as a result of an unwillingness or inability of the operating system to schedule execution of the adjunct partition.

Hardware and Software Environment

Figure 1:
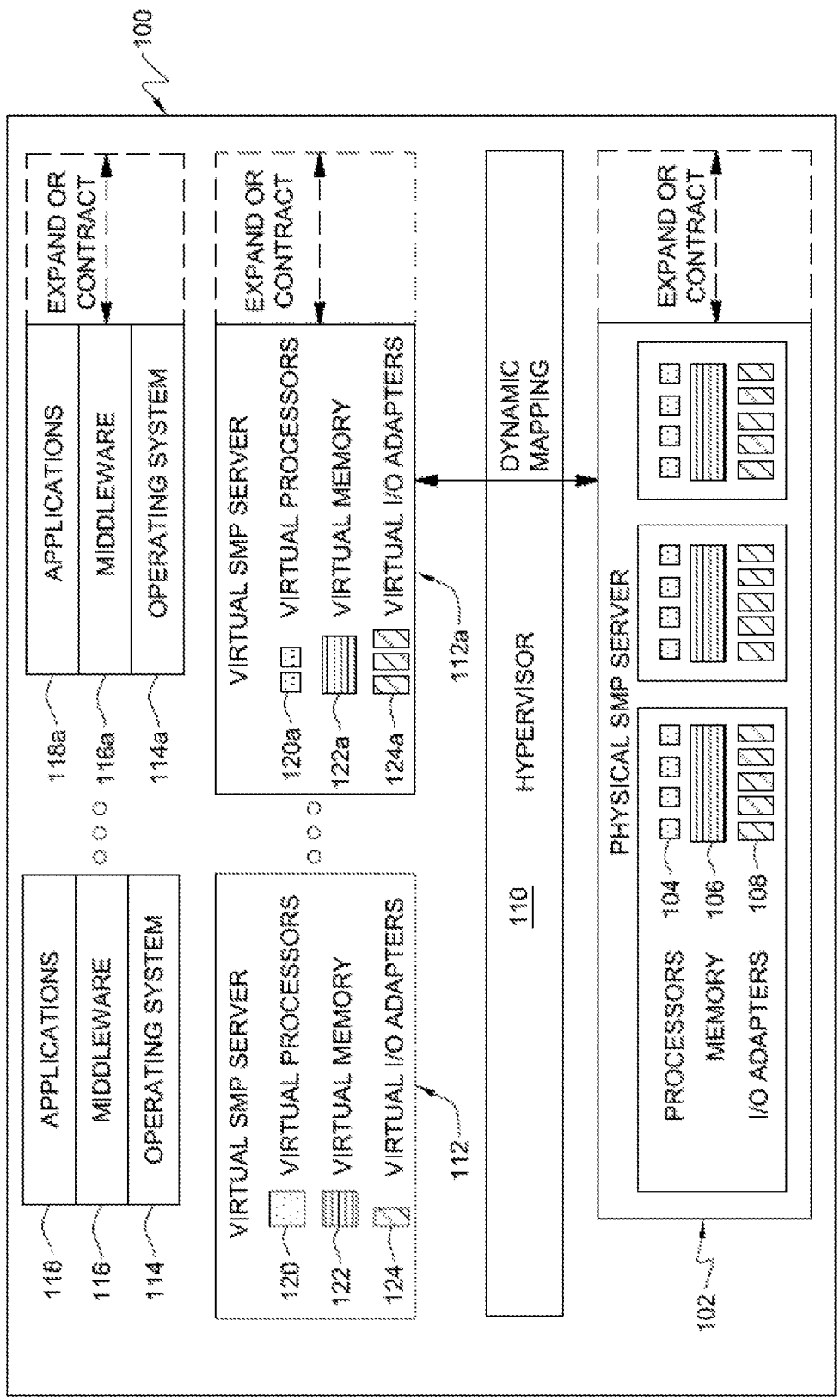
FIG. 1 is a block diagram of one embodiment of a data processing system configured to implement one or more aspects of the present invention.

Now turning to the Drawings, wherein like numbers denote like parts throughout the several views, FIG. 1 is a block diagram of a data processing system or computer 100, which in one example is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110, which may also be referred to as a partition manager, virtual machine monitor or PHYP. Processors 104 are shared processors and each may be a simultaneous multi-threading (SMT)-capable processor that is capable of concurrently executing multiple different threads on the processor.

A virtual server, or logical partition, is a proxy for a physical server that has the same capabilities, interfaces, and state. Virtual servers 112 are created and managed by a hypervisor 110 that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes virtual processors 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the virtual servers or logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
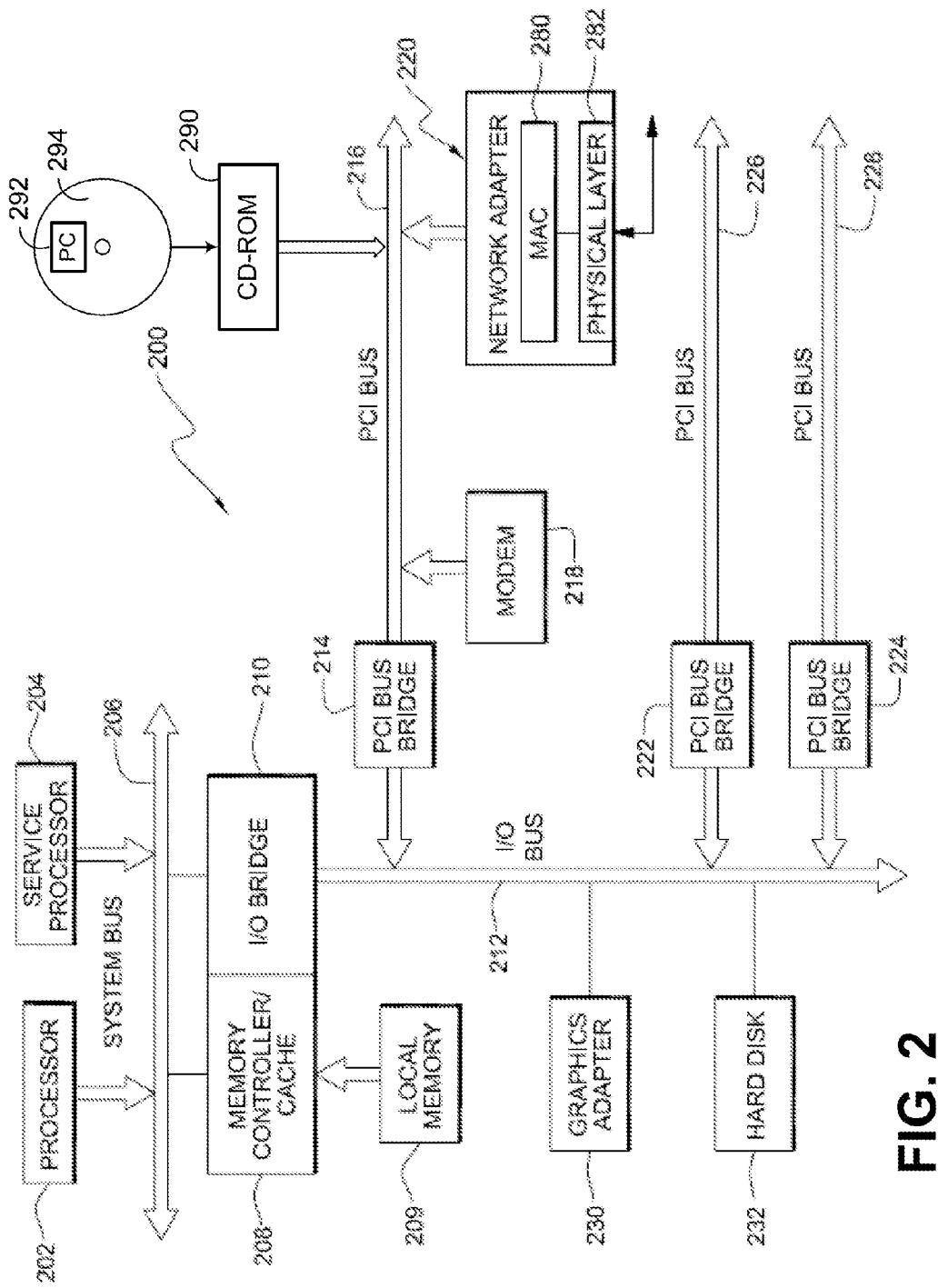
FIG. 2 is a more detailed illustration of a data processing system that may be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, the data processing system implementing an adjunct partition such as described hereinbelow can be built upon technologies found in IBM's p/i Series product line firmware and systemware, such as described in the "Power Architecture Platform Reference" (PAPR) material at Power.org (http://www.power.org/members/developers/specs/PAPR_Version_2.2_09Oct07.pdf).

One or more aspects of the present invention can also be included in an article of manufacture (e.g., one or more computer program products) having, for instance, computer readable media. The media has therein, for instance, computer readable program code or logic (e.g., instructions, code, commands, etc.) to provide and facilitate the capabilities of the present invention. The article of manufacture can be included as a part of a computer system or sold separately. One example of an article of manufacture or a computer program product is illustrated in FIG. 2 and incorporates computer readable program code 292 stored on a computer readable medium such as an optical disk 294, and readable by an optical drive 290 coupled to data processing system 200. Additional examples of computer readable media include various physical and/or non-transitory media such as a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-RAN) and DVD.

A sequence of program instructions or a logical assembly of one or more interrelated modules defined by computer readable program code or logic direct the performance of one or more aspects of the present invention.

Although various embodiments are described herein, these are only examples. Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one hardware-implemented processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output (I/O) devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

In addition, various program code described herein may be identified based upon the application or software component within which it is implemented in specific embodiments of the invention. However, it should be appreciated that any particular program nomenclature used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Adjunct Partitions

Embodiments consistent with the invention utilize adjunct partitions, or partition adjuncts, which are partitions that are more limited than full, logical partitions. As described below, the adjunct partition runs in a flat, static effective address space and problem state. These restrictions permit the hypervisor to apply a range of hypervisor and processor optimizations that result in a substantial decrease in system overhead associated with a context switch of the state machine from a logical partition to state data of an adjunct partition, that is, compared to a context switch of the state machine between logical partitions. In other respects, an adjunct partition is similar to a full logical partition. For example, an adjunct partition can be assigned resources, either physical or virtual, similar to a full logical partition. Further, an adjunct partition can be an end-point of a virtual input output (VIO) communications mechanism, similar to a full logical partition, such as a virtual input output server (VIOS).

Figure 3:
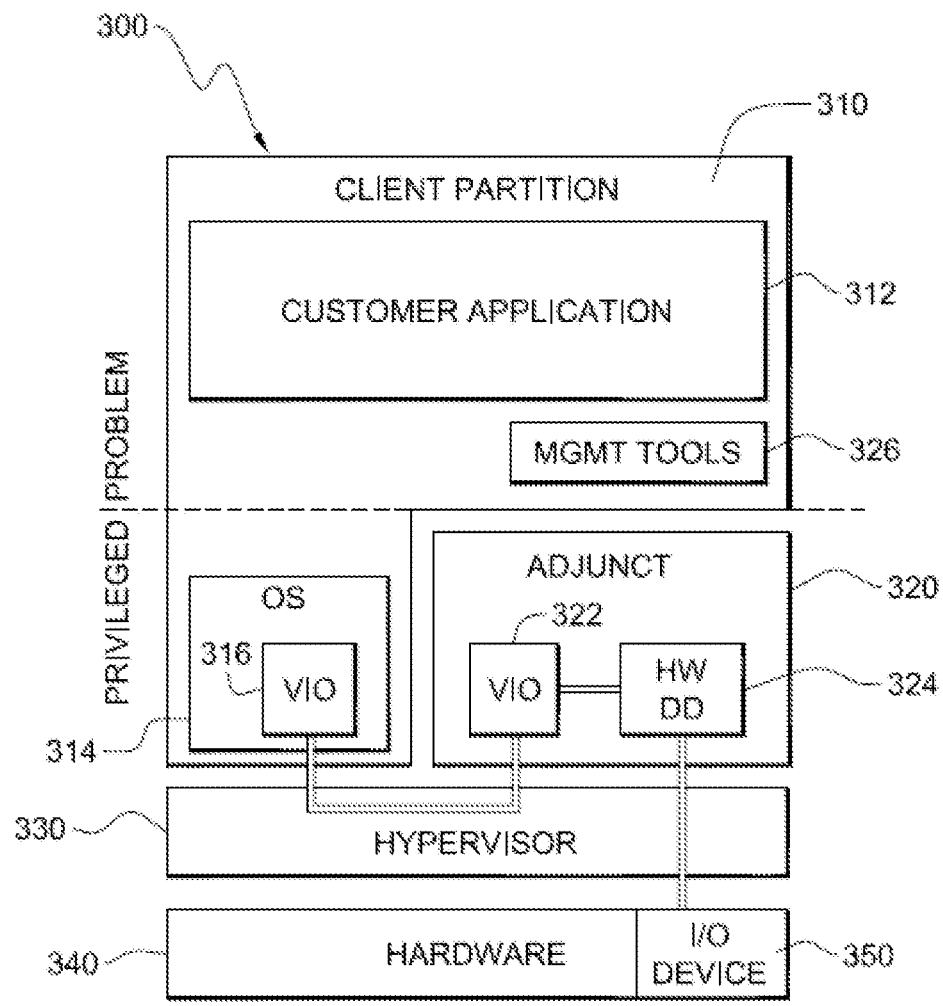
FIG. 3 illustrates one embodiment of a data processing system comprising a client logical partition and an adjunct partition, in accordance with an aspect of the present invention.

FIG. 3 illustrates one example of a data processing system 300, comprising a client logical partition (or simply client partition) 310 and an adjunct partition 320, in accordance with an aspect of the present invention. Client partition 310 is a logical partition which comprises one or more customer applications 312, an operating system instance 314 and a virtual I/O facility 316. Client partition 310 runs atop a hypervisor 330, and provides higher-level function than that provided by the hypervisor itself. Hypervisor 330 executes atop the underlying system hardware 340, which is shown to include one or more I/O devices 350.

Adjunct partition 320 is conceptually a child partition to client partition 310. The adjunct partition is less than a full logical partition, but is run in a manner whereby the hypervisor enforces security and isolation between the adjunct partition and the client partition it runs within. The adjunct partition is provided with reduced functionality compared with a full logical partition, for example, has no access to memory management unit (MMU) configuration or floating-point facilities, and is an environment that only the functionality needed to run the desired service (e.g., I/O driver) is provided. In the illustrated example, adjunct partition 320 includes a virtual I/O interface 322 and a hardware device driver service 324, which allows access to I/O device 350. In operation, client partition 310 accesses I/O device 350 via the adjunct partition 320, as illustrated. By reducing functionality within the adjunct partition environment, the run time overhead of dispatching and maintaining the adjunct partition (compared with another full logical partition) is reduced, and consequently, many of the performance disadvantages of using a separate logical partition as a virtual input output server (VIOS) are avoided.

As a specific example, the adjunct partition is described herein as running a reduced operating system environment for a device driver service. This service is provided by way of example only. The adjunct partition provides minimal, optimized, infrastructure comprising only (in one example) the structure needed by a device driver. For instance, if a Linux device driver is to run inside of the adjunct partition, then the minimal execution environment includes only the Linux kernel services or equivalent services, that the Linux device driver requires. If an AIX device driver is to run inside of the adjunct partition, then the minimal execution environment includes only the AIX kernel services, or equivalent services, that the AIX device driver requires. Advantageously, the adjunct partition runs in hypervisor/problem-state, directly against hypervisor interfaces. As explained in detail below, dispatching of the adjunct partition does not require a full partition context switch, which simplifies adjunct kernel requirements. This is achieved, in part, by mapping the adjunct partition into the client partition's virtual address page table. Client partition to adjunct partition isolation can be achieved, for example, via hypervisor-managed memory keys. Advantageously, the adjunct partition is not customer viewable. Further, the same adjunct partition service (referred to herein as a global adjunct partition service) may be instantiated within multiple client partitions, as explained below.

Various adjunct partition usage models can be implemented in accordance with the concepts disclosed herein for addressing a number of operating system and platform issues. One example is a local adjunct partition, which conceptually partially resides within an initiating client partition for accessing dedicated resources through a hypervisor. For example, a common adapter/driver service may be provided by adjunct partition for a respective dedicated adapter (i.e., resource).

As another alternative, a global adjunct partition may be used, wherein a service logical partition such as a virtual input output server partition donates memory and physical resources for instantiation of the adjunct partition. Such a global adjunct partition may be accessible or attachable by multiple client partitions, and may provide, for example, input output services to a resource via a hypervisor. As a specific example, the global adjunct partition may comprise a common adapter driver service, and the resource a shared adapter. Yet another embodiment of a global adjunct partition may rely on a hypervisor to provide resources for the adjunct. In this implementation, the hypervisor employs the adjunct partition for its own use, for example, for protection or isolation services that would otherwise exist in the hypervisor's execution domain.

In the illustrated embodiments, in order for an adjunct partition to be a runable program, the hypervisor, along with a client partition that is to use the adjunct partition service, negotiate to establish the adjunct partition environment. Once this negotiation is complete, the client partition will have donated a portion of its virtual address space to the hypervisor for use by the adjunct partition. The hypervisor will use hardware and hypervisor facilities to ensure that the client partition no longer has access to or can modify the donated resources (e.g., the donated virtual address space). The hypervisor instantiates the effective address mappings required to run the adjunct partition using the donated virtual address resources. Subsequently, the hypervisor may switch between dispatching the client partition or the adjunct partition by reprogramming its control of the donated virtual address space. When the client partition runs, it may access all virtual address space assigned to it, except for the donated virtual address range, and when the adjunct partition runs, the hypervisor disables access to all virtual addresses of the client partition, except for the donated virtual address range, that is, the virtual address space to which it is enabled. This toggling of active/inactive virtual address ranges is significantly faster than reprogramming the full memory management and address translation hardware to effect a complete context switch of the current state machine between two full logical partitions, as is necessary to switch, for example, to a virtual input/output server partition. In this manner, the adjunct partition address space is carved out of and separated from the memory management and address translation hardware resources of the client partition. The adjunct partition is thus, from a processor's perspective, part of the client partition, but from the client partition's and hypervisor's perspective, is a distinct entity.

Advantageously, the adjunct partition concepts presented herein reduce the need to use full logical partitions for providing services to client partitions. This in turn frees up resources and improves performance for customer workloads. Additionally, the adjunct partition disclosed herein encourages the development and deployment of virtual platform services in lieu of development of operating system specific services by reducing the performance penalties associated with virtualized services. This in turn allows for savings and cost development, since services may be implemented only once (i.e., in an adjunct partition), rather than natively among multiple operating systems.

Additional details regarding adjunct partitions, their configuration and use, and the various modifications that may be implemented in adjunct partitions consistent with the invention, may be found, for example, in U.S. patent application Ser. No. 12/111,020 filed Apr. 28, 2008 by Armstrong et al. (now published as U.S. P.G. Pub. No. 2009/0037941), which claims priority to U.S. Provisional Application Ser. No. 60/953,512, filed Aug. 2, 2007, each of which is incorporated by reference herein in its entirety.

Figure 4A:
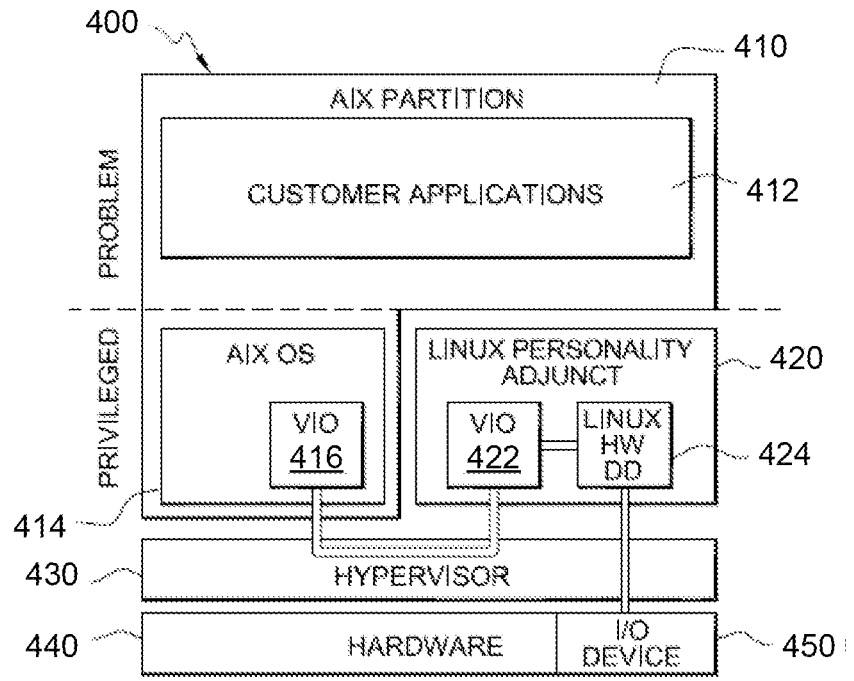
FIGS. 4A & 4B illustrate examples of an adjunct partition configuration wherein non-native operating system's device drivers are employed to access or use a physical input/output device, in accordance with an aspect of the present invention.
Figure 4B:
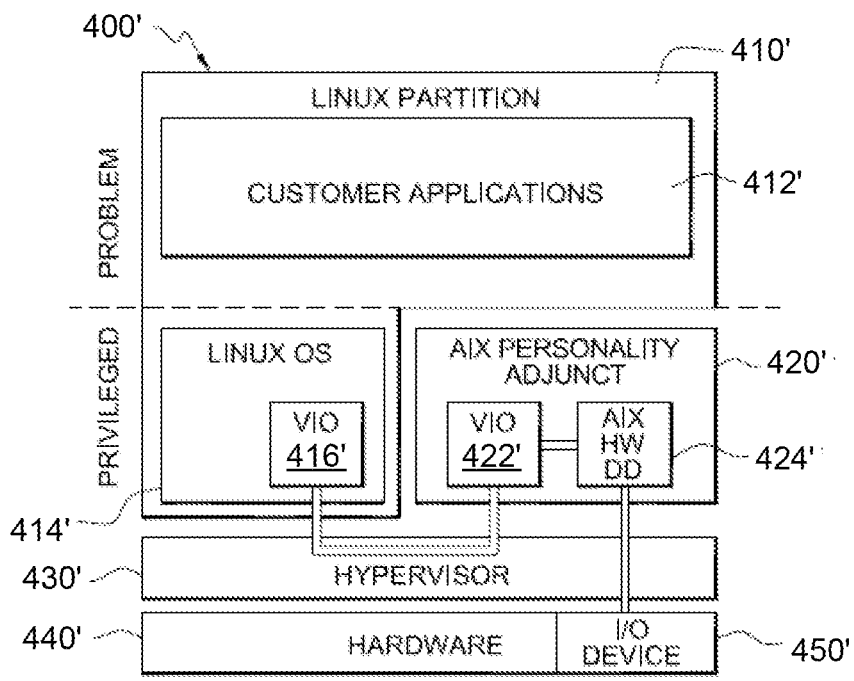

As noted above, one usage of adjunct partitions is to host device drivers, which can reduce device driver development costs by enabling device drivers to be shared between operating systems. Adjunct partitions are lightweight execution environments which operate in a separate execution state from the conventional problem and privileged states of the user applications and kernel services, respectively. This new execution state is referred to herein as the hypervisor/problem state, and is illustrated in FIGS. 4A & 4B (wherein AIX and Linux are depicted by way of example only). As explained below, instead of deploying a full VIOS partition, an operating system may instead employ an adjunct partition to support a particular, non-configurable I/O device assigned to that logical partition. In such a case, an adjunct partition is created which employs a non-native operating system's device driver as an interface to the assigned physical I/O device. Note that the native and non-native operating systems may be any two different operating systems.

FIG. 4A depicts one example of this aspect of the present invention. In this figure, a data processing system 400 is shown to comprise an AIX partition 410 and a Linux personality adjunct partition (or Linux personality adjunct) 420. AIX partition 410 is a logical partition which includes one or more customer applications 412, an AIX operating system instance 414, and a virtual I/O facility 416. AIX partition 410 runs above a hypervisor 430, and provides higher-level function than that provided by the hypervisor. Hypervisor 430 executes on top of the underlying system hardware 440, which is shown to include (one or more) I/O device 450 assigned to AIX partition 410.

Linux personality adjunct 420 is conceptually a dedicated, child partition to AIX partition 410. As described above, the adjunct partition is less than a full logical partition, but is running in a manner whereby the hypervisor enforces security and isolation between the adjunct partition and the AIX partition it runs with. The adjunct partition is provided with reduced functionality compared with a full logical partition. For example, the adjunct partition has no access to memory management unit (MMU) configuration or floating-point facilities, and is an environment wherein only the functionality needed to run the desired service (e.g., I/O driver) is provided.

In the illustrated example, the Linux personality adjunct 420 includes a virtual I/O interface 422 and a hardware device driver service 424, which allows access to I/O device 450. In this example, the hardware device driver service 424 is a Linux hardware device driver, which runs within the Linux personality adjunct 420 spawned by the AIX partition 410 in response to the AIX partition noting that it had assigned to it an I/O device 450 which was non-configurable by the AIX partition. The Linux personality adjunct 420 includes non-native kernel services sufficient to run the Linux hardware device driver for the physical I/O device. These non-native kernel services are less than a corresponding, full operating system, that is, less than a full Linux operating system in this example.

In operation, AIX partition 410 accesses I/O device 450 via the virtual I/O interface 416, 422 between the AIX operating system 414 and the Linux personality adjunct 420, which includes the Linux hardware device driver 424. By providing the non-native, Linux personality to the adjunct partition, the Linux hardware device driver is able to be run within the adjunct partition, and thereby provide access to an I/O device 450 originally assigned to AIX partition 410, notwithstanding that the I/O device is non-configurable by the AIX partition. The device becomes accessible to the AIX partition through the Linux personality adjunct 420.

FIG. 4B depicts another example of the use of an adjunct partition to provide access to a non-configurable I/O device assigned to a logical partition, which in this case is a Linux partition 410' of a data processing system 400'. The adjunct partition for this implementation is an AIX personality adjunct 420', which includes sufficient non-native, AIX kernel services within the adjunct partition to run a non-native operating system's device driver, that is, an AIX hardware device driver 424' in this example. These non-native kernel services are less than a corresponding, full operating system, that is, less than the full AIX operating system conventionally required to run the AIX hardware device driver. The Linux partition 410' is a logical partition which includes one or more customer applications 412', a Linux operating system 414', and a virtual I/O facility 416'. Linux partition 410' runs above a hypervisor 430', and provides higher-level function than that provided by the hypervisor. Hypervisor 430' executes on top of the underlying system hardware 440', which is shown to include (one or more) I/O device 450'.

AIX personality adjunct 420' is again conceptually a child partition to client partition 410'. The adjunct partition is less than a full logical partition, but is run in a manner whereby the hypervisor enforces security and isolation between the adjunct partition and the client partition it runs within, as described above. The adjunct partition is an environment wherein only the functionality needed to run the desired service (e.g., I/O driver) is provided. In this example, it is assumed that the adjunct is dedicated to the spawning logical partition, that is, Linux partition 410'.

In the illustrated example, AIX personality adjunct 420' includes a virtual I/O interface 422' and the AIX hardware device driver 424', which allows access to I/O device 450'. In operation, Linux partition 410' accesses I/O device 450' via the adjunct partition 420', as illustrated.

As used herein, a personality adjunct is an adjunct partition which has a particular operating system personality, but is less than the full operating system. In the implementation described herein, the personality adjunct is a non-native personality to the native operating system of the logical partition spawning the adjunct partition. For example, AIX partition 410 of FIG. 4A initiates creation of a Linux personality adjunct, while Linux partition 410' of FIG. 4B initiates creation of an AIX personality adjunct. These are provided by way of example only. In an alternate implementation, the personality adjunct may be a native personality to a native operating system of the logical partition spawning the adjunct partition. Further, in the non-native implementation, the personality implemented within the adjunct partition may be any non-native operating system to any native operating system of the logical partition. The personality adjunct includes a minimal service set of an operating system device driver runtime environment required by a particular device driver to run inside the adjunct. A device driver conforms to a programming environment that is defined by its host operating system environment. This programming environment typically includes a variety of kernel services for things such as memory allocation, timer services, interrupt handler registration, and invocation in response to interrupts, mapping I/O buffers for DMA (direct memory access), etc. The personality adjunct provides these services and functions in the same way that a real host operating system kernel does, such that the device driver running inside the adjunct does not know the difference between its native host operating environment and the personality adjunct described herein. This enables the unmodified device driver to be run within a lighter weight adjunct partition, in place of a full logical partition.

By way of specific example, the Linux personality adjunct 420 of FIG. 4A provides a runtime environment and kernel services which mimic the Linux device driver programming interfaces and execution environment, while the AIX personality adjunct 420' of FIG. 4B provides the runtime environment and kernel services which mimic the AIX device driver programming interfaces and execution environment of a full AIX operating system.

Multiple adjunct partitions may also be employed to provide multiple logical partitions with access to, for example, a self-virtualizing input/output device, such as a self-virtualizing input/output adapter. In a virtualized system, if a single input/output adapter is present, and that adapter is to service multiple logical partitions of the data processing system, then input/output virtualization (IOV) capabilities of the input/output device, if present, may be employed to instantiate multiple virtual functions (VF), each of which appears as an input/output adapter to a respective client logical partition. One example of a self-virtualizing input/output device is the single root input/output virtualized hardware described, for example, in "Single Root I/O Virtualization and Sharing Specification", Revision 1.0, PCI-SIG (Sep. 11, 2007), which is incorporated herein by reference in its entirety.

Adjunct partition instances may be deployed in a manner wherein each adjunct partition instance is created to support a particular logical partition to virtual function (or queue pair) pairing. Using this approach, each logical partition accesses a corresponding virtual function or queue pair employing abstract virtual input/output mechanisms. From the point of view of the client partition, this functionality is similar (or equivalent) to a VIOS implementation. However, the disadvantages of such a system are avoided since each logical partition to virtual function (or queue pair) association has a unique adjunct partition instance facilitating communication therebetween. Since each adjunct partition instance handles only a single logical partition and a single virtual function (or queue pair) it is not necessary to include locks or synchronization mechanisms otherwise needed to support multiplexing of the I/O adapter, since the system relies on the multiplexing capabilities within the self-virtualizing input/output capable device itself.

Another advantage of this adjunct partition implementation is that, since all adjunct partition instances are considered for the same device, they are able to share code and read only data, which substantially reduces the memory foot-print required to support the implementation, with the memory foot-print cost of adding an adjunct partition instance being simply the cost associated with maintaining dynamic state information for the logical partition to virtual function (or queue pair) pairing for the new adjunct partition instance.

Further, adjunct partition instances, since they are configured to support only one logical partition to virtual function (or queue pair) pairing at a time, may be readily written in a manner to avoid many of the synchronization and locking mechanisms required by traditional I/O stacks and drivers, both in native device drivers and VIOS-based implementations. For example, adjunct partitions may be written as polling state machines, and the dedicated nature of their runtime environment precludes the need to support active preemption, thus simplifying or eliminating the need for locking.

To summarize, the use of adjunct partitions in the manner described herein permits logical partitions to obtain I/O services from input/output virtualization-capable, input/output devices or adapters in a manner that minimizes the device-driver development required for each operating system of the logical partition, since the operating systems only see virtual input/output (VIO) services (e.g., device driver services), not specific physical input/output adapter devices. This avoids the need to instantiate a logical partition to multiplex the underlying I/O hardware, and permits the multiplexing of I/O hardware to be accomplished via efficient VIO hardware capabilities, rather than software locks in a VIOS. This last aspect is a property that arises from the unique programming model of an adjunct partition, and assumes that a particular adjunct partition implementation used to support a particular I/O device makes use of these properties to create an efficient implementation.

Figure 5:
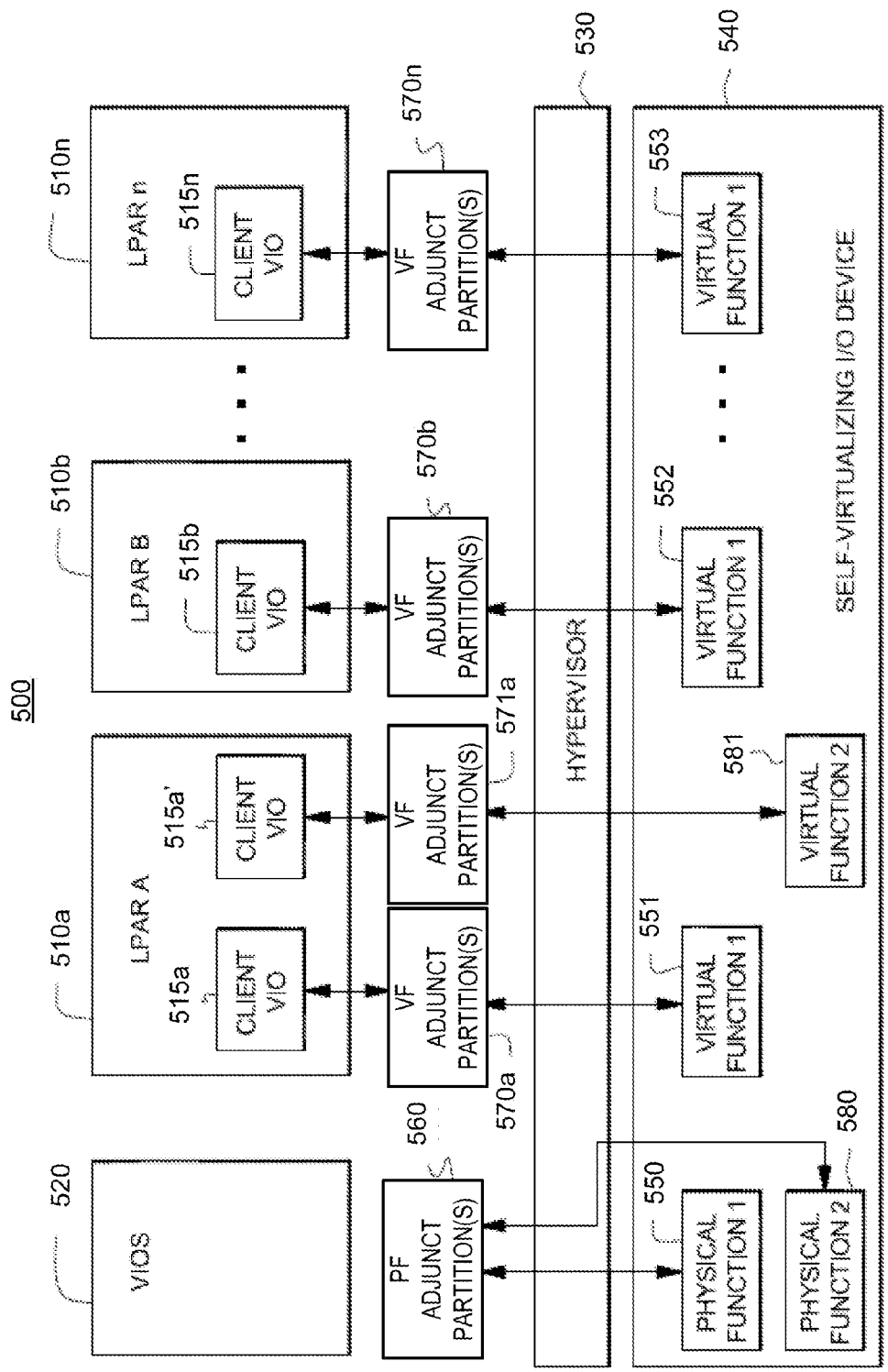
FIG. 5 illustrates one embodiment if a data processing system wherein multiple logical partitions are interfaced via device drivers within the multiple logical partitions to multiple virtual function instances of a self-virtualizing IO resource.

FIG. 5 depicts one embodiment of a data processing system, generally denoted 500, in accordance with an aspect of the present invention. Within data processing system 500, multiple logical partitions 510*a*, 510*b* . . . 510*n*, and a VIOS 520 run above a hypervisor 530, and provide higher-level function than that provided by the hypervisor. Hypervisor 530 executes on top of underlying system hardware, including a self-virtualizing input/output device (or adapter) 540. VIOS 520 is optional within the data processing system embodiment depicted. The self-virtualizing input/output device 540 is, in one embodiment, an input/output virtualization capable I/O adapter. This adapter may present multiple virtual function instances 551, 552, 553 from a first physical function 550, each of which presents the functionality associated with a normal I/O adapter. Further, in this embodiment, a second physical function 580 is depicted, from which a second virtual function 581 is provided, by way of example.

Each virtual function is assigned to provide I/O services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 570*a*, 571*a*, 570*b*, 570*n* are referred to as virtual function (VF) adjunct partitions due to the dedicated nature of the adjunct partitions to a particular logical partition to virtual function pairing. For all virtual functions associated with a same underlying hardware device, i.e., physical function 550 or physical function 580, the adjunct partition instances instantiated are the same. That is, each adjunct partition instance 570*a*, 570*b* . . . 570*n* is the same, while adjunct partition instantiation 571*a* is assumed to be different since it interfaces to a different virtual function 581, associated with a different physical function 580. Advantageously, by interjecting adjunct partitions between the logical partitions and the virtual functions, the input/output within each logical partition can be virtualized as a client virtual input/output (VIO) 515*a*, 515*a'*, 515*b* . . . 515*n*.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification". The physical function would thus contain the SR-IOV capability structure. A virtual function is associated with the physical function, and shares one or more physical resources, such as a link, with the physical function and with other virtual functions that are associated with the same virtual function. A "function" means, in one embodiment, an addressable entity in configuration space associated with a single function number. A function may refer to one function in a multi-function device, or to the only function in a single-function device.

A physical function adjunct partition 560 is employed during initial configuration of the data processing system to facilitate setup of the virtual function adjunct partitions. Note that in the data processing system embodiment depicted in FIG. 5, multiple physical functions and multiple different virtual function instances are illustrated, two of which are accessed by a single logical partition via different virtual function adjunct partitions 570a, 571a. One, two or more than two physical functions may be implemented within the self-virtualizing input/output device, and each logical partition may access one or more of these physical functions via an associated virtual function of the device. Also, note that the client virtualized interfaces or drivers (client VIO 515a, client VIO 515a') within LPAR A 510a may be the same or different types of virtual interfaces or drivers, depending on the adjunct partition instances implemented for the particular logical partition to virtual function pairing.

The virtual function adjunct partitions 570a, 571a, 570b, 570n implement, in one embodiment, a server virtual adapter device driver, which interfaces with the respective client VIO within the associated logical partition, as well as a device driver for the virtual function on the self-virtualizing input/output device adapter. Each adjunct partition drives the respective virtual function on the adapter similar to the server virtual adapter device driver within a VIOS implementation. Creation of the adjunct partitions may be initiated by the respective logical partition, or by the hypervisor within the data processing system. Further, the advantages and characteristics of the respective adjunct partitions would be the same as described above. By way of example, each adjunct partition may implement a non-native operating system's device driver from the native operating system of the associated logical partition.

Those skilled in the art will note from the above discussion that the programming model described herein allows adjunct partition code developers to write code in a manner that allows typical operating system-kernel-code locking and synchronization primitives to be simplified or avoided. Adjunct partitions may be efficiently written as single-threaded polling state machines, and by controlling the degree of concurrency visible to a particular adjunct partition instance, it is possible to ensure that adjunct partition code may assume a runtime environment that is non-preemptive and single-threaded. For input/output processing work, there is little need for multiple threads to simultaneously execute to service a particular logical partition to virtual function pairing. These properties are feasible because each adjunct partition instance services a single logical partition to virtual function pairing in an isolated/protected environment (that is, a separate dispatchable state protected as described above), and adjunct partition instances can be deployed with overhead low enough to permit a single adjunct instance per logical partition to virtual function pairing, unlike a VIOS implementation.

Similarly, a data processing system similar to data processing system 500 may be utilized in connection with a self-virtualizing input/output device that utilizes a basic function and a queue structure virtualizable into multiple queue pairs. Each queue pair may be associated with the function, and may share one or more physical resources, such as a link, with the function and with other queue pairs that are associated with the same function. Multiple adjunct partitions may be employed to interface, for example, multiple logical partitions to respective queue pairs within the self-virtualizing input/output device, with a function adjunct partition employed during initial configuration of the data processing system to facilitate initial setup of the adjunct partitions. By providing an adjunct partition as an interface between each logical partition to queue pair pairing, a virtual input/output interface or driver can be employed within the respective logical partition. In this case, the logical partition is unaware of the actual type of hardware employed. The adjunct partition may include, for example, a server virtual device driver interfaced to a respective client VIO of the associated logical partition, as well as an appropriate physical adapter device driver for interfacing to the respective queue pair within the self-virtualizing input/output device.

Additional details regarding adjunct partitions are described in the aforementioned cross-referenced applications. In addition, various modifications to the adjunct partitions described herein will be appreciated by one of ordinary skill in the art having the benefit of the instant disclosure. Therefore, the invention is not limited to the particular adjunct partition implementations discussed herein.

Vendor-Independent Virtual Network Partition Interface

To facilitate the integration of new or upgraded self-virtualizing IO resources such as self-virtualizing network adapters, a vendor-independent partition interface may be utilized between a logical partition and an adjunct partition associated with a self-virtualizing IO resource to effectively abstract away vendor-specific interface details for the self-virtualizing IO resource.

Figure 6A:
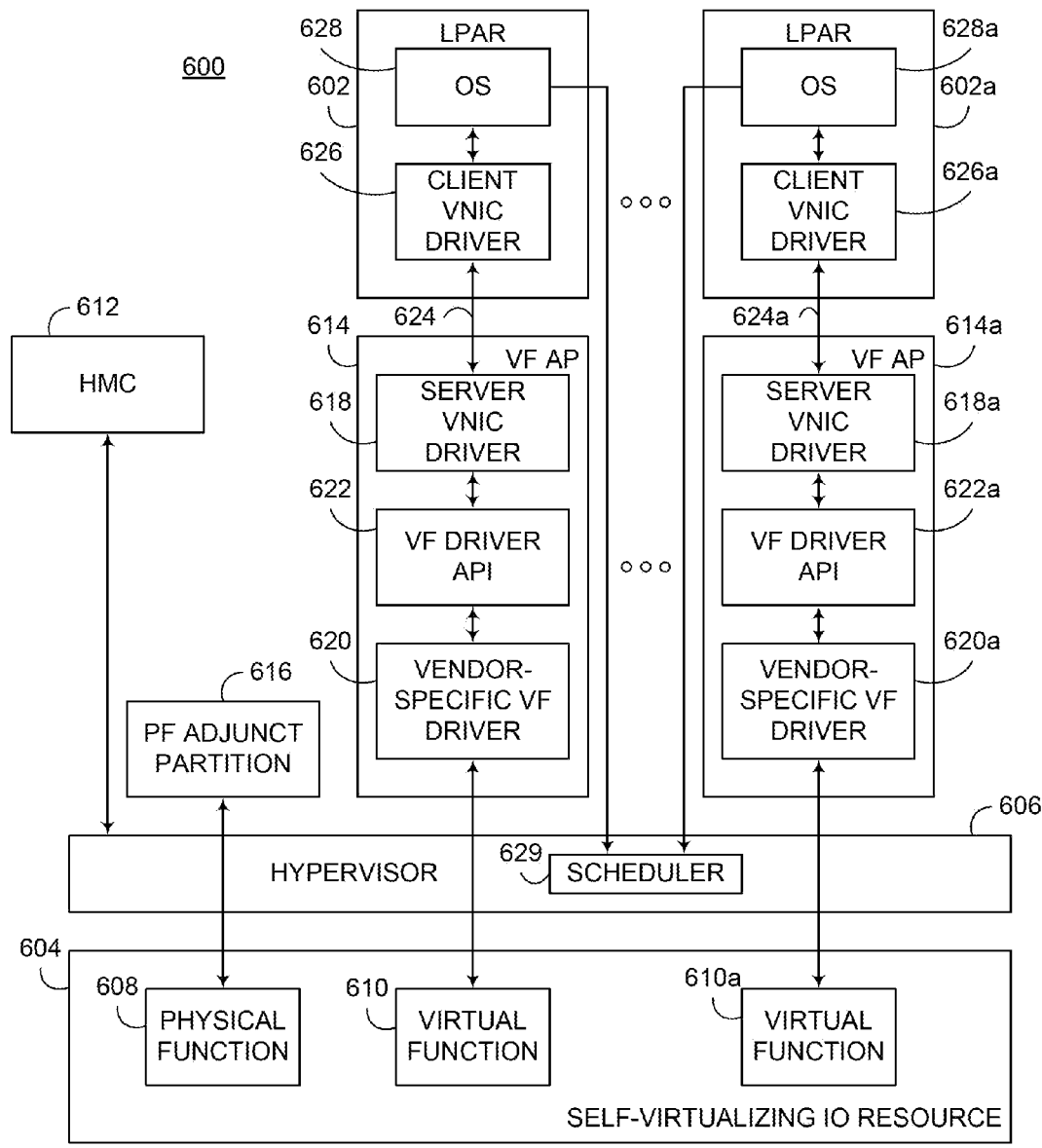
FIGS. 6A & 6B illustrate one embodiment of a data processing system within which an adjunct partition work scheduling process consistent with the invention may be implemented.

As shown in FIG. 6A, for example, a data processing system 600 may include multiple logical partitions 602, 602a interfacing with a self-virtualizing IO resource 604 through a hypervisor 606. Hypervisor 606 executes on top of other underlying system hardware in addition to self-virtualizing IO resource 604; however, only resource 604 is illustrated to facilitate a better understanding of the invention. The self-virtualizing input/output device 604 is, in one embodiment, an input/output virtualization capable I/O adapter, e.g., an SRIOV network adapter. This adapter may present multiple physical functions, each of which presenting the functionality associated with a non-virtualized I/O adapter, and each with multiple virtual function instances associated therewith, e.g., physical function 608 with associated virtual function instances 610, 610a. A hardware management console (HMC) 612, run above a hypervisor 606, may optionally be used to provide higher-level function than that provided by the hypervisor.

Each virtual function 610, 610a is assigned to provide I/O services to a particular logical partition 602, 602a in the data processing system. The logical partitions in question avoid having direct interactions with their virtual functions, so as to maintain hardware abstraction, by employing adjunct partition instances instantiated for each logical partition to virtual function pairing. These adjunct partitions 614, 614a, which are implemented as firmware components for data processing system 600, are referred to as virtual function (VF) adjunct partitions due to the dedicated nature of the adjunct partitions to a particular logical partition to virtual function pairing. For all virtual functions associated with a same underlying hardware device, i.e., physical function 608, the adjunct partition instances instantiated are the same. That is, each adjunct partition instance 614, 614a is the same.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification," and described above in connection with FIG. 5. The physical function would thus contain the SR-IOV capability structure. A virtual function is associated with the physical function, and shares one or more physical resources, such as a link, with the physical function and with other virtual functions that are associated with the same virtual function.

A physical function adjunct partition 616 is employed during initial configuration of the data processing system to facilitate setup of the virtual function adjunct partitions. One, two or more than two physical functions may be implemented within the self-virtualizing input/output device, and each logical partition may access one or more of these physical functions via an associated virtual function of the device.

It the illustrated embodiment, to support access to the self-virtualizing IO resource by the logical partitions, each adjunct partition includes a server device driver 618, 618a, vendor-specific virtual function device driver 620, 620a and virtual function driver API 622, 622a. Server device driver 618, 618a provides a generic, vendor-independent virtual network partition interface 624, 624a with a client device driver 626, 626a in the associated logical partition 602, 602a. The interface is generic and vendor-independent to the extent that the interface does not need to be changed or tailored based upon vendor-specific implementation details of different makes and models of self-virtualizing IO resources. Vendor-specific implementation details are instead handled in the vendor-specific virtual function device driver 620, 620a, which is accessible to the server device driver 618, 618a through a VF driver API 622. API 622, which is optional in some embodiments, further abstracts away implementation details to higher software layers, and further limits the amount of customization required to accommodate new makes and models of self-virtualizing IO resources. In many instances, VF driver API 622 may require no modifications in order to support new or revised vendor-specific virtual function device drivers 620, 620a.

In the illustrated embodiment, the vendor-independent virtual network partition interface relies on a network protocol, referred to herein as a virtual network interface controller (VNIC) protocol, to facilitate communications between client and server device drivers. The herein-described protocol supports the implementation, within a client logical partition, of a VNIC adapter device driver (VNIC client), which is functionally similar to a physical Ethernet adapter device driver, and is thus usable to interface with a virtual function of a self-virtualizing IO resource such as an SRIOV network adapter. The VNIC protocol supports sending and receiving Ethernet-compatible packets, adding receive buffers to the virtualized hardware, handling physical and logical link status, acquiring hardware statistics, and utilizing advanced hardware features like checksum offload. The VNIC protocol also provides tracing, logging, and dumping facilities, and the VNIC protocol desirably requires no changes in any layer 3 or higher communication protocol (e.g. TCP, IP, etc.). The VNIC protocol also desirably has reliability, availability and support (RAS) capabilities, and supports the concept of privileges, e.g., to enable a logical partition to set physical port attributes and run diagnostics. It will be appreciated, however, that a vendor-independent virtual network partition interface may be implemented using different protocols, so the invention is not limited to the particular VNIC protocol described herein.

Additional details regarding the vendor-independent virtual network partition interface may be found, for example, in U.S. patent application Ser. No. 12/946,316, filed on Nov. 15, 2010 by Cunningham et al., and entitled "VIRTUALIZATION OF VENDOR SPECIFIC NETWORK INTERFACES OF SELF-VIRTUALIZING INPUT/OUTPUT DEVICE VIRTUAL FUNCTIONS," which is incorporated by reference herein.

Vendor-Independent Adjunct Management Channel Interface

To facilitate the integration of new or upgraded self-virtualizing IO resources such as self-virtualizing network adapters, a vendor-independent interface may also be utilized between a hypervisor and an adjunct partition associated with a self-virtualizing IO resource to effectively abstract away vendor-specific interface details for managing and configuring the self-virtualizing IO resource.

Figure 6B:
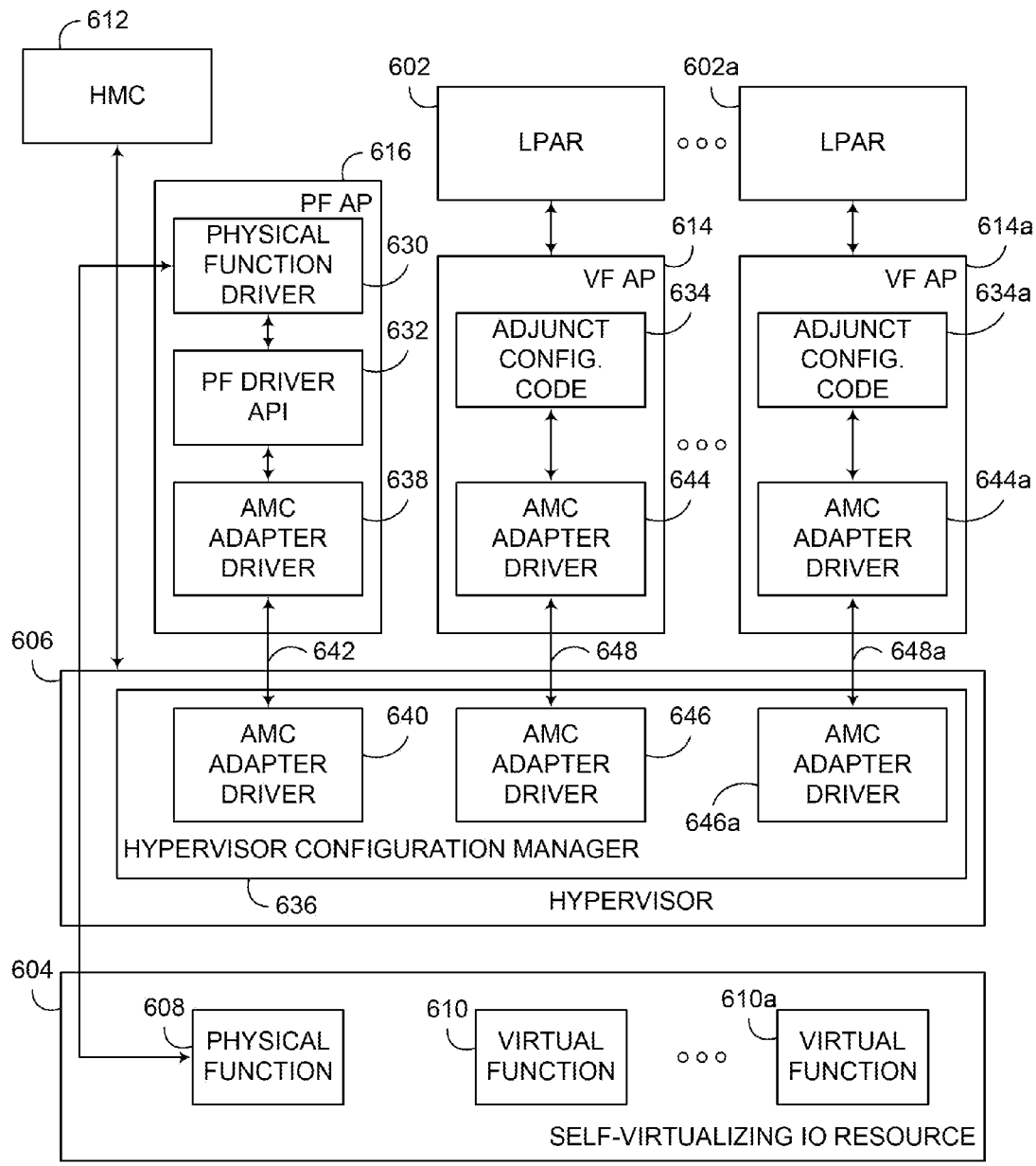

For example, as shown in FIG. 6B, data processing system 600 may also support a vendor independent adjunct management channel (AMC) interface to support the configuration and management of a self-virtualizing IO resource and its associated adjunct partitions. It the illustrated embodiment, physical function adjunct partition 616 includes a physical function device driver 630, which is used to access physical function 608 of resource 604 for the purpose of managing and configuring the resource. An Applications Programming Interface (API) 632 may also be used to abstract vendor-specific details of a particular resource 604.

Each virtual function adjunct partition 614, 614a includes adjunct configuration program code 634, 634a, which is used to configure the adjunct partition. Hypervisor (PHYP) 606 includes a configuration manager 636, which is used to coordinate configuration and management of resource 604 and the adjunct partitions 614, 614a, 616 associated therewith. In this regard, an AMC interface is utilized between the configuration manager 624 and the adjunct partitions. The AMC interface is implemented using paired virtual adapters resident respectively in the adjunct partitions and the hypervisor.

For physical function adjunct partition 616, for example, an AMC adapter device driver 638 interfaces with a corresponding AMC adapter device driver 640 resident in hypervisor 606 over an AMC channel 642. Likewise, for virtual function adjunct partitions 614, 614a, AMC adapter device drivers 644, 644a interface with corresponding AMC adapter device drivers 646, 646a resident in hypervisor 606 over AMC channels 648, 648a.

In the illustrated embodiment, the AMC interface relies on a network protocol, referred to herein as an AMC protocol, to facilitate communications between paired AMC adapter device drivers, which is similar in many respects to the virtual network interface control (VNIC) protocol described in the aforementioned '316 application. Additional details regarding the AMC protocol may be found, for example, in U.S. patent application Ser. No. 12/955,698, filed on Nov. 29, 2010 by Barrett et al., and entitled "VIRTUALIZATION OF VENDOR SPECIFIC CONFIGURATION AND MANAGEMENT OF SELF-VIRTUALIZING INPUT/OUTPUT DEVICE," which is also incorporated by reference herein.

Adjunct Partition Platform Work Scheduling with Quality of Service Attributes

Returning to FIG. 6A, as noted above, adjunct partitions are small partitions that execute within the contexts of regular logical partitions, and in embodiments consistent with the invention, virtual function adjunct partitions 614, 614a interface logical partitions 602, 602a with virtual functions 610, 610a of a self-virtualizing IO resource 604, and incorporate virtual function device drivers 620, 620a for providing the interface to the virtual functions 610, 610a.

The virtual function adjunct partitions 614, 614a, and thus the virtual function device drivers 620, 620a resident therein, are shipped and implemented within the firmware of logically partitioned data processing system 600, and are therefore considered trusted code. The firmware also includes hypervisor 606 and any physical function adjunct partitions 616.

However, in the normal mode of operation, while the virtual function adjunct partitions 614, 614a run trusted code, the execution of each virtual function adjunct partition is under the direct control of an operating system 628, 628a installed in the associated logical partition 602, 602a. In particular, in embodiments consistent with the invention, while hypervisor 606 is ultimately responsible for scheduling work in data processing system 600, e.g., using a scheduler 629, or scheduling logic, hypervisor 606 is responsive to each operating system 628, 628a when scheduling work on behalf of the logical partitions 602, 602a and the adjunct partitions 614, 614a therefor, i.e., when scheduling execution of the logical partitions and the adjunct partitions to handle certain partition-related work. From the perspective of each virtual function adjunct partition 614, 614a, therefore, scheduling of execution of such adjunct partition to handle partition work, such as handling the transmission of frames between the self-virtualizing IO resource 604 and logical partitions 602, 602a, is under the direct control of the associated operating system 628, 628a. Typically, the operating system controls scheduling by notifying the firmware to perform a context switch to an adjunct partition. In the case of transmitting a frame to the resource, for example, the operating system would notify the firmware when the operating system is ready to transmit a frame, and in the case of receiving a frame from the resource, the operating system would notify the firmware in response to receiving a virtual interrupt, e.g., an interrupt over the vendor-independent virtual network (VNIC) partition interface 624, 624a, notifying the operating system that an incoming frame is ready to be received.

On the other hand, it has been found that certain reliability, availability and serviceability (RAS) capabilities and management functions supported by the firmware require the virtual function device drivers for all of the associated virtual functions of a self-virtualizing IO resource to perform work in concert with each other. However, with control over scheduling of adjunct partitions entrusted to their associated operating systems, a possible denial of service scenario exists, since the trusted code needed to perform platform wide RAS and management services is ultimately under the control of an untrusted operating system. Therefore, if an operating system in one logical partition has hung or has crashed, and is thus unable to schedule execution of an associated adjunct partition, or if the operating system is unwilling to schedule the adjunct partition to execute because of other higher priority work ongoing in the logical partition within which the operating system resides, the inability of the adjunct partition to perform platform work may also prevent other adjunct partitions, such as other virtual function adjunct partitions associated with the same physical function, to also complete their platform work.

Therefore, to address this potential denial of service problem and provide a quality of service (QoS) guarantee to the platform, embodiments consistent with the invention support a scheduling override mechanism for the firmware that permits the firmware to take over scheduling decisions for one or more adjunct partitions from the operating systems in the associated logical partitions. Thus, whenever a request for platform work is sent to an adjunct partition that requires a QoS guarantee, the firmware tracks that as an outstanding request for platform work. The number of outstanding platform work requests is tracked for each adjunct partition, and if an adjunct partition currently has any outstanding platform work, its execution is scheduled by the firmware (e.g., by the scheduler 629 in hypervisor 606) to ensure the adjunct partition is run independent of the scheduling desires of the operating system in the associated logical partition. When the trusted code in the adjunct partition receives a platform work request, it performs the necessary work and informs or notifies the firmware that it has completed the requested platform work, so that once all of the requests for platform work for an adjunct partition have been processed, firmware will then return to honoring the scheduling desires of the operating system in the associated logical partition.

In the context of the invention, therefore, platform work that requires a QoS guarantee may include any platform-related work that requires an adjunct partition to perform a service that other adjunct partitions or other entities in a data processing system need to have performed in order to complete their own work or otherwise proceed. Examples of platform work of this type includes EEH recovery, error logging, tracing, heartbeating, version checking and adjunct partition configuration and management, etc. This is in contrast to partition work, which is generally associated with a logical partition. In the case of an adjunct partition associated with a virtual function on an SRIOV network adapter, for example, the bulk of the partition work would be associated with handling the transmission and reception of frames or packets of data to and from a virtual or physical network.

It will also be appreciated that in some embodiments, some platform work for an adjunct partition may not require any QoS guarantee, and thus may not require overriding an operating system's scheduling decisions. For example, some configuration and management operations performed on an adjunct partition may not be relevant to any other related adjunct partitions, and thus may not raise a concern regarding denial of service.

Now with reference to FIG. 6B, typically platform work for a virtual function adjunct partition 614, 614a in data processing system 600 is received over an AMC channel 648, 648a, and is either issued by a physical function adjunct partition 616 or hypervisor 606. As such, in the illustrated embodiment, hypervisor 606 monitors requests issued over the AMC interface, and in response to requests of the type requiring a QoS guarantee, hypervisor 606 overrides the operating system to which the target virtual function adjunct partition for a request is assigned, and schedules the virtual function adjunct partition for execution to handle the request. In addition, the virtual function adjunct partition is configured to notify the hypervisor when it has completed the platform work, whereby the hypervisor returns scheduling control for the virtual function adjunct partition to the associated operating system.

Figure 7:
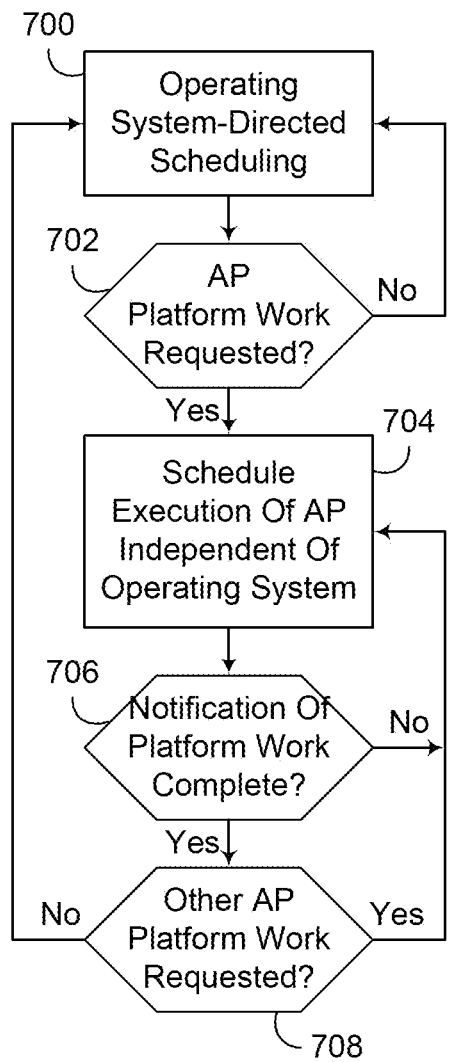
FIG. 7 illustrates a sequence of operations for scheduling work for a logical partition with support for QoS guarantees for adjunct partition platform work in the data processing system of FIGS. 6A-6B.

FIG. 7 illustrates one implementation of a scheduling routine suitable for scheduling adjunct partition platform work with QoS guarantee, and typically implemented in the firmware, e.g., in the hypervisor, of a logically partitioned data processing system. As shown in block 700, in the absence of any request for platform work requiring QoS guarantees, scheduling of work for a logical partition is handled using a conventional operating system-directed scheduling algorithm. In response to detecting a request for adjunct partition platform work that requires a QoS guarantee, however, block 702 passes control to block 704 to schedule execution of the adjunct partition independent of the operating system in the logical partition. It will be appreciated that if multiple virtual threads or virtual processors are supported for a logical partition, the operating system may still direct the scheduling of those other virtual threads and processors while execution of the adjunct partition is being scheduled independent of the operating system.

Scheduling proceeds in this manner until a notification is received the adjunct partition that the platform work is complete, in block 706. This notification may take the form, for example, of the adjunct partition releasing the virtual thread that was used to perform the platform work, or in other suitable manners. If the notification is received, block 706 passes control to block 708 to determine whether other adjunct partition platform work is pending, and if not, control returns to block 700 to resume operating system-directed scheduling for the logical partition. Otherwise, if either a notification has not been received (block 706) or additional platform work requires handling by the adjunct partition (block 708), control returns to block 704 to continue scheduling the adjunct partition independent of the operating system.

Figure 8:
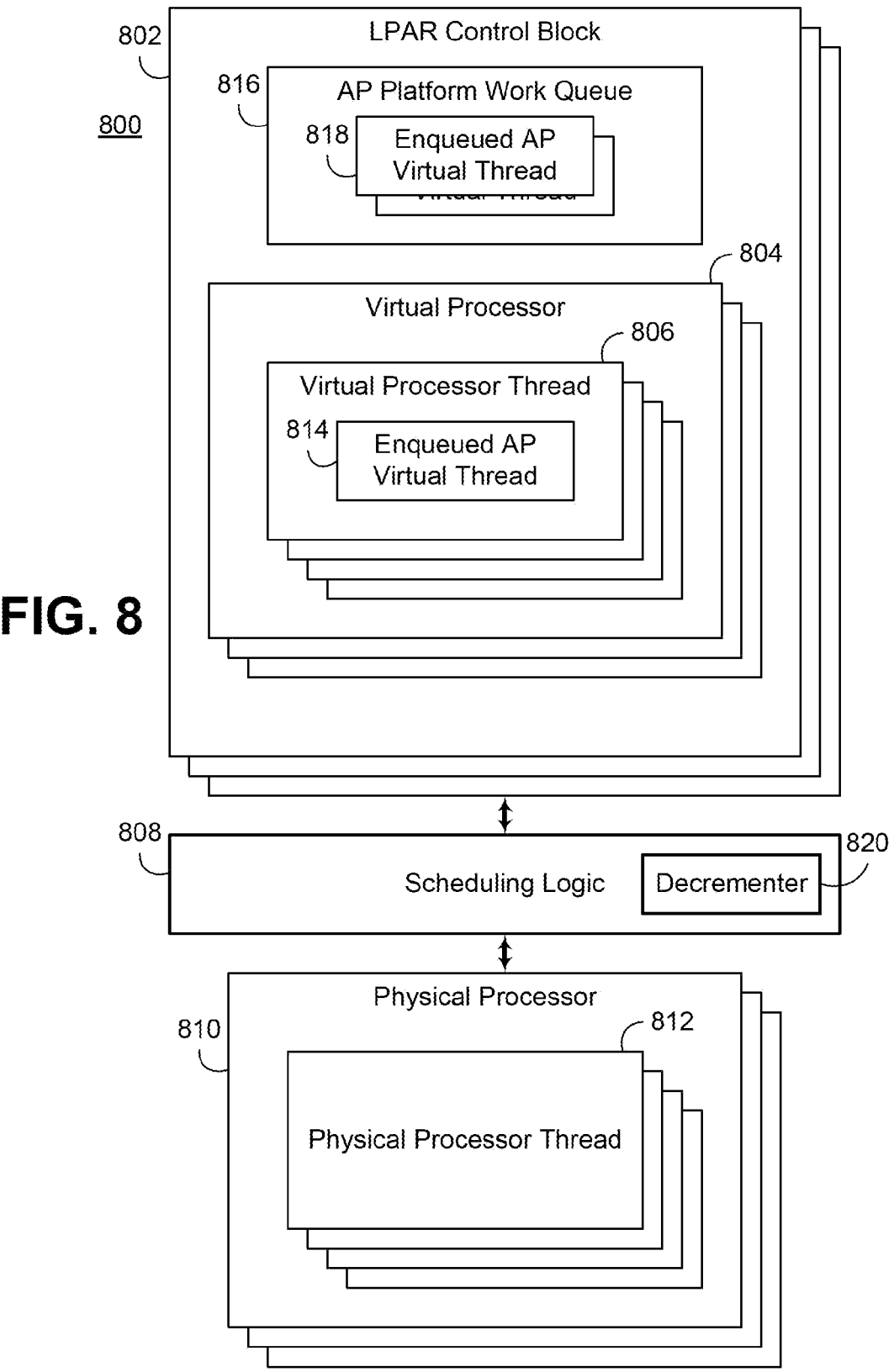
FIG. 8 illustrates an exemplary implementation of scheduling logic capable of being implemented in the data processing system of FIGS. 6A-6B.

FIG. 8 illustrates one specific implementation of scheduling-related logic 800 suitable for being implemented in logically partitioned data processing systems consistent with the invention and implementing the aforementioned scheduling routine of FIG. 7. For this exemplary logic, each logical partition includes a control block 802 within which is resident one or more virtual processors 804, with each virtual processor supporting one or more virtual threads 806. Scheduling logic 808, typically resident in a hypervisor, dispatches virtual threads to one or more physical processors 810, which may support one or more physical threads 812. As is well known in the virtual machine art, one function of a hypervisor or virtual machine monitor is to schedule the execution of virtual threads or processors on physical processors, or in some instances, individual physical threads in physical processors (e.g., when physical processors support simultaneous multithreading (SMT). Multiple virtual threads are allowed to execute concurrently by dynamically dispatching those virtual threads to physical processors and/or physical threads, allowing the virtual threads to execute on the physical resources until they have completed their work or have ceded control of the physical resources, or unless preempted due to higher priority work requiring execution or as a result of time-division multiplexing.

To support adjunct partition work scheduling with QoS attributes, virtual threads associated with adjunct partitions, hereinafter referred to as AP virtual threads, may either be enqueued, or assigned, to a virtual processor thread 806 for the associated logical partition, as shown at 814, or may be enqueued or assigned to a separate logical partition-wide adjunct partition platform work queue 816, as shown at 818. In the illustrated embodiment, adjunct partition platform work queue 816 can enqueue multiple AP virtual threads, thereby enabling multiple platform work requests to be enqueued for later execution, while each virtual processor thread is capable of having only a single virtual thread enqueued thereon (while another virtual thread may be currently "executing" on that virtual processor thread). It will be appreciated that each virtual processor thread may support the enqueuing of multiple virtual threads in other embodiments.

Scheduling logic 808 may also include one or more decrementers 820, which function as timers that trigger exceptions to the scheduling logic to handle time-division multiplexing.

Otherwise, scheduling logic 808 may utilize various known algorithms to schedule execution of virtual threads on physical resources, as would be appreciated by one of ordinary skill in the art having the benefit of the instant disclosure. Among other features, for example, scheduling logic 808 may be responsive to instructions from the operating systems resident in the logical partitions, as shown for scheduler 629 of FIG. 6A, so that primary scheduling responsibility for a logical partition is directed by the operating systems, including scheduling responsibility for the associated adjunct partitions. As will become more apparent below, however, embodiments consistent with the invention detect platform work for an adjunct partition that requires a QoS guarantee, and effectively schedule execution of the adjunct partition independent of the operating system to enable the adjunct partition to handle the requested platform work. Scheduling logic in a hypervisor that schedules execution of virtual threads for a logical partition under the direction of an operating system in that logical partition is referred to herein as operating system-directed scheduling logic.

Figure 9:
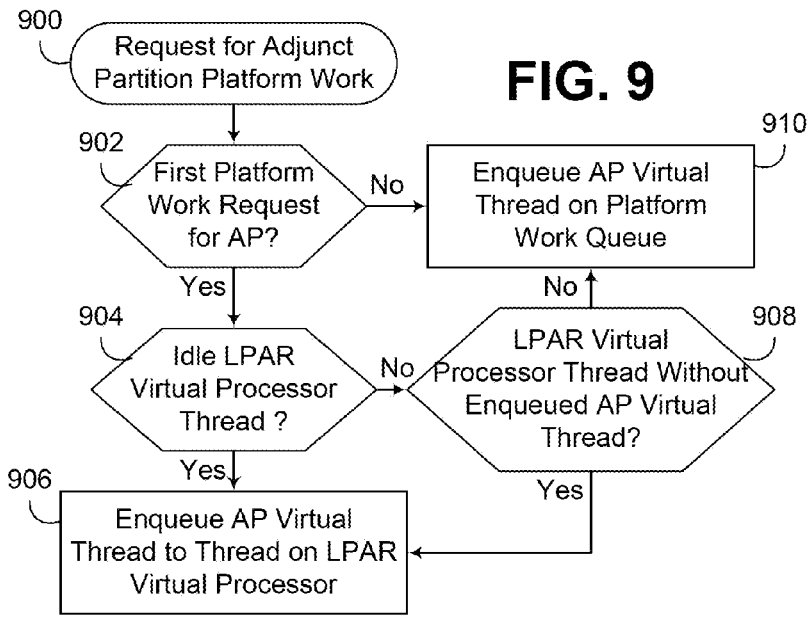
FIG. 9 illustrates a sequence of operations for processing a request for adjunct partition platform work in the data processing system of FIGS. 6A-6B.

Now turning to FIG. 9, this figure illustrates a routine 900 capable of being executed by the hypervisor in response to detecting a request for platform work for an adjunct partition. The hypervisor may detect such a request, for example, by monitoring the AMC interface for each adjunct partition and detecting AMC commands that are designated as operations requesting platform work that requires a QoS guarantee (which may include some or all of the supported AMC commands). In response to such a request, block 902 first determines whether this is the first platform work request for the adjunct partition, i.e., whether any other pending platform work is already awaiting processing by an adjunct partition, typically based upon another adjunct partition virtual thread already being enqueued on the adjunct partition platform work queue 816 (FIG. 8).

Assuming first that no other platform work is pending for the adjunct partition, block 902 passes control to block 904 to determine whether an idle virtual processor thread for the logical partition associated with the adjunct partition is currently available, e.g., whether a virtual thread currently exists that is not currently executing a virtual thread for the adjunct partition or the logical partition associated therewith. If so, control passes to block 906 to enqueue the adjunct partition virtual thread on the queue for the idle virtual processor thread so that the adjunct partition virtual thread will desirably be executed by an execution resource allocated to the logical partition.

If not, block 904 passes control to block 908 to determine whether there is a virtual processor thread for the associated logical partition that does not currently have an adjunct partition virtual thread already enqueued on that virtual processor thread. If so, control passes to block 906 to enqueue the adjunct partition virtual thread on a virtual processor thread for the logical partition that does not have an adjunct partition virtual thread currently enqueued thereon.

On the other hand, if no such virtual processor thread exists, block 908 passes control to block 910 to enqueue the adjunct partition virtual thread on the platform work queue 816 (FIG. 8) for the logical partition. As such, routine 900 attempts to enqueue an adjunct partition virtual thread first on a virtual processor thread for the adjunct partition's associated logical partition, and then on the platform work queue if no such virtual processor thread is available. In other embodiments, however, all platform work requests may be handled by enqueuing adjunct partition virtual threads on a platform work queue.

It will be appreciated that a separate routine 800 may be dedicated to each adjunct partition, or alternatively, a single routine may be used to monitor requests for platform work for multiple or all adjunct partitions, and enqueue virtual threads on the appropriate queues based upon the targets of such platform work. Likewise, a single, platform-wide platform work queue may be used, or alternatively, multiple adjunct partition dedicated platform work queues may be used.

Figure 10:
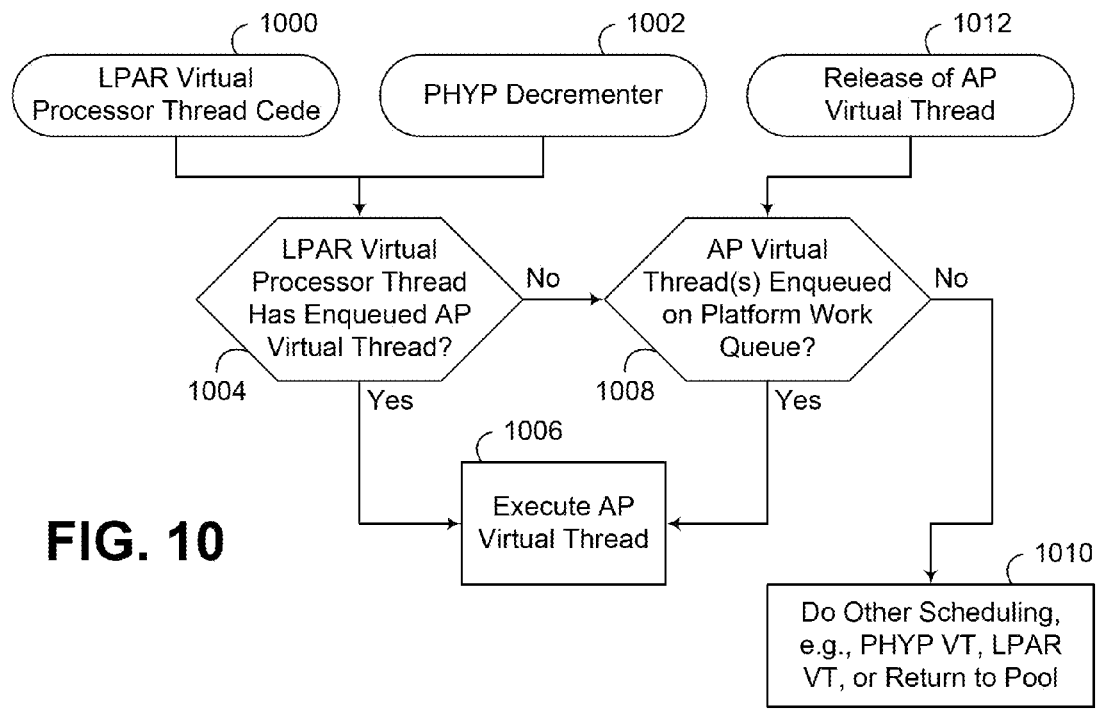
FIG. 10 illustrates a sequence of operations for executing an adjunct partition virtual thread in the data processing system of FIGS. 6A-6B.

FIG. 10 next illustrates the execution of an adjunct partition virtual thread by the hypervisor of data processing system 600. In particular, in response to either a virtual processor thread of a logical partition ceding control to the hypervisor (block 1000), or in response to an exception triggered by a hypervisor decrementer (block 1002), block 1004 determines whether a virtual processor thread for the logical partition has an adjunct partition virtual thread enqueued thereon. If so, control passes to block 1006 to allocate execution resources to the adjunct partition virtual thread and execute the virtual thread on a physical processor thread allocated to the logical partition. Otherwise, block 1004 passes control to block 1008 to determine whether any adjunct partition virtual thread is enqueued on the platform work queue. If so, control passes to block 1006 to execute the virtual thread. Otherwise, control passes to block 1010 to perform other conventional logical partition work scheduling, e.g., to execute virtual threads associated with the hypervisor or the logical partition, or to return a virtual processor to the processor pool. In the illustrated embodiments, such conventional scheduling may be responsive to commands from the operating system resident in the logical partition.

In addition, as shown in block 1012, upon the release of an adjunct partition virtual thread, control also passes to block 1008 to determine whether another adjunct partition virtual thread is still enqueued on the platform work queue. If so, the next pending adjunct partition virtual thread is executed in the manner described above. Consequently, whenever any platform work is pending on the platform work queue for a logical partition, the scheduling logic will loop back to ensure that each of the adjunct partition virtual threads that are pending on the platform work queue will be executed.

Therefore, embodiments of the invention minimize the risk of an operating system causing a platform-wide denial of service condition due to being unable or unwilling to schedule execution of an adjunct partition when platform work requiring a QoS guarantee, particularly when operating system-directed scheduling logic is utilized to schedule execution of virtual threads associated with a logical partition. Embodiments of the invention typically do so by scheduling execution of an adjunct partition independent of an operating system to enable the adjunct partition to handle requested platform work, such that requested platform work effectively overrides the scheduling decisions of the operating system.

It will be appreciated that the implementation of the aforementioned adjunct partition platform work scheduling functionality in a logically partitioned data processing system would be within the abilities of one of ordinary skill in the art having the benefit of the instant disclosure. Moreover, while the embodiments discussed herein implement the scheduling override functionality in a hypervisor, it will be appreciated that the monitoring of platform work requests and/or the overriding of scheduling may be implemented elsewhere in the firmware of a logically partitioned computer, or in any other trusted code therein.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of scheduling execution of an adjunct partition assigned to a logical partition in a logically partitioned data processing system, the method comprising:
    scheduling execution of the adjunct partition under control of an operating system resident in the logical partition to enable the adjunct partition to handle partition work for the logical partition; and
    in a firmware of the logically partitioned data processing system and in response to a request for platform work requiring a Quality of Service (QoS) guarantee, selectively overriding the scheduling of execution of the adjunct partition under control of the operating system by scheduling execution of the adjunct partition independent of the operating system to enable the adjunct partition to handle the requested platform work and to ensure that the adjunct partition will be allocated sufficient execution resources to handle the platform work and meet the QoS guarantee.

2. The method of claim 1, wherein the adjunct partition includes a separate dispatchable state and employs virtual address space donated from the logical partition or a hypervisor of the data processing system.

3. The method of claim 1, wherein the adjunct partition includes a virtual function adjunct partition associated with a virtual function for a self-virtualizing IO resource.

4. The method of claim 3, wherein the self-virtualizing IO resource comprises an SRIOV Ethernet adapter.

5. The method of claim 1, further comprising, after scheduling execution of the adjunct partition to handle the requested platform work, receiving in the firmware a notification from the adjunct partition that the platform work is complete, and in response to receiving the notification, returning to scheduling execution of the adjunct partition under control of the operating system.

6. The method of claim 1, wherein the notification includes the adjunct partition releasing a virtual thread.

7. The method of claim 1, wherein the firmware includes a hypervisor that is configured to schedule work in the logically partitioned data processing system, wherein the hypervisor is configured to perform operating system-directed scheduling to schedule execution of at least one of the logical partition and the adjunct partition in response to instructions from the operating system, and wherein the hypervisor is configured to schedule execution of the adjunct partition to handle the platform work without receiving an instruction from the operating system.

8. The method of claim 1, further comprising, in the firmware, tracking requests for platform work for the adjunct partition, wherein scheduling execution of the adjunct partition to handle the requested platform work is performed in response to the firmware detecting the request when tracking requests for platform work.

9. The method of claim 8, wherein tracking requests for platform work for the adjunct partition includes enqueuing adjunct partition virtual threads associated with the requests to a platform work queue associated with the logical partition.

10. The method of claim 8, wherein scheduling execution of the adjunct partition independent of the operating system to enable the adjunct partition to handle the requested platform work includes enqueuing an adjunct partition virtual thread on a virtual processor thread associated with the logical partition if the logical partition has a virtual processor thread that is idle or does not already have an adjunct partition virtual thread enqueued thereon, and enqueuing the adjunct partition virtual thread on the platform work queue if the logical partition does not have a virtual processor thread that is idle or does not already have an adjunct partition virtual thread enqueued thereon.

11. The method of claim 1, wherein the request for platform work is associated with platform work that impacts another adjunct partition in the logically partitioned data processing system.

12. The method of claim 1, wherein the adjunct partition is interfaced with a hypervisor through a vendor-independent Adjunct Management Channel (AMC) interface, the adjunct partition including a partition AMC device driver and the hypervisor including a hypervisor AMC device driver configured to interface with the partition AMC device driver over the AMC interface, and wherein the request includes an AMC command received by the hypervisor over the AMC interface.

13. An apparatus, comprising:
at least one processor; and
program code configured upon execution by the at least one processor to schedule execution of an adjunct partition assigned to a logical partition in a logically partitioned data processing system by scheduling execution of the adjunct partition under control of an operating system resident in the logical partition to enable the adjunct partition to handle partition work for the logical partition, and, in a firmware of the logically partitioned data processing system and in response to a request for platform work requiring a Quality of Service (QoS) guarantee, selectively overriding the scheduling of execution of the adjunct partition under control of the operating system by scheduling execution of the adjunct partition independent of the operating system to enable the adjunct partition to handle the requested platform work and to ensure that the adjunct partition will be allocated sufficient execution resources to handle the platform work and meet the QoS guarantee.

14. The apparatus of claim 13, wherein the adjunct partition includes a separate dispatchable state and employs virtual address space donated from the logical partition or a hypervisor of the data processing system.

15. The apparatus of claim 13, wherein the adjunct partition includes a virtual function adjunct partition associated with a virtual function for a self-virtualizing IO resource.

16. The apparatus of claim 15, wherein the self-virtualizing IO resource comprises an SRIOV Ethernet adapter.

17. The apparatus of claim 13, wherein the program code is further configured to, after scheduling execution of the adjunct partition to handle the requested platform work, receive in the firmware a notification from the adjunct partition that the platform work is complete, and in response to receiving the notification, return to scheduling execution of the adjunct partition under control of the operating system.

18. The apparatus of claim 13, wherein the notification includes the adjunct partition releasing a virtual thread.

19. The apparatus of claim 13, wherein the firmware includes a hypervisor that is configured to schedule work in the logically partitioned data processing system, wherein the hypervisor is configured to perform operating system-directed scheduling to schedule execution of at least one of the logical partition and the adjunct partition in response to instructions from the operating system, and wherein the hypervisor is configured to schedule execution of the adjunct partition to handle the platform work without receiving an instruction from the operating system.

20. The apparatus of claim 13, wherein the firmware is configured to track requests for platform work for the adjunct partition, wherein the program code is configured to schedule execution of the adjunct partition to handle the requested platform work in response to the firmware detecting the request when tracking requests for platform work.

21. The apparatus of claim 20, wherein the firmware is configured to track requests for platform work for the adjunct partition by enqueuing adjunct partition virtual threads associated with the requests to a platform work queue associated with the logical partition.

22. The apparatus of claim 20, wherein the program code is configured to schedule execution of the adjunct partition independent of the operating system to enable the adjunct partition to handle the requested platform work by enqueuing an adjunct partition virtual thread on a virtual processor thread associated with the logical partition if the logical partition has a virtual processor thread that is idle or does not already have an adjunct partition virtual thread enqueued thereon, and enqueue the adjunct partition virtual thread on the platform work queue if the logical partition does not have a virtual processor thread that is idle or does not already have an adjunct partition virtual thread enqueued thereon.

23. The apparatus of claim 13, wherein the request for platform work is associated with platform work that impacts another adjunct partition in the logically partitioned data processing system.

24. The apparatus of claim 13, wherein the adjunct partition is interfaced with a hypervisor through a vendor-independent Adjunct Management Channel (AMC) interface, the adjunct partition including a partition AMC device driver and the hypervisor including a hypervisor AMC device driver configured to interface with the partition AMC device driver over the AMC interface, and wherein the request includes an AMC command received by the hypervisor over the AMC interface.

25. A program product, comprising:
a non-transitory computer readable medium; and
program code stored on the computer readable medium and configured upon execution to schedule execution of an adjunct partition assigned to a logical partition in a logically partitioned data processing system by scheduling execution of the adjunct partition under control of an operating system resident in the logical partition to enable the adjunct partition to handle partition work for the logical partition, and, in a firmware of the logically partitioned data processing system and in response to a request for platform work requiring a Quality of Service (QoS) guarantee, selectively overriding the scheduling of execution of the adjunct partition under control of the operating system by scheduling execution of the adjunct partition independent of the operating system to enable the adjunct partition to handle the requested platform work and to ensure that the adjunct partition will be allocated sufficient execution resources to handle the platform work and meet the QoS guarantee.

* * * * *